United States Patent
Yang et al.

(10) Patent No.: US 8,717,869 B2
(45) Date of Patent: May 6, 2014

(54) METHODS AND APPARATUS TO DETECT AND RESTORE FLAPPING CIRCUITS IN IP AGGREGATION NETWORK ENVIRONMENTS

(75) Inventors: Chen-Yui Yang, Marlboro, NJ (US); Paritosh Bajpay, Edison, NJ (US); Robert Ferro, Jackson, NJ (US); Luis Figueroa, Spotswood, NJ (US); Monowar Hossain, Middletown, NJ (US); Thiru Ilango, Holmdel, NJ (US); David Lu, Morganville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 391 days.

(21) Appl. No.: 12/645,060

(22) Filed: Dec. 22, 2009

(65) Prior Publication Data

US 2011/0149721 A1    Jun. 23, 2011

(51) Int. Cl.
G01R 31/00 (2006.01)
(52) U.S. Cl.
USPC .......................................... 370/216; 370/242
(58) Field of Classification Search
USPC .......... 370/216–224, 241, 242–246, 252, 465
See application file for complete search history.

(56) References Cited

U.S. PATENT DOCUMENTS

| | | | | |
|---|---|---|---|---|
| 7,012,897 B1 * | 3/2006 | Sowizral et al. | ............... | 370/242 |
| 7,107,274 B2 * | 9/2006 | Sekiguchi et al. | ............ | 707/781 |
| 7,830,785 B2 * | 11/2010 | Li et al. | ......................... | 370/216 |
| 7,961,601 B2 * | 6/2011 | Lu et al. | ........................ | 370/225 |
| 2005/0063320 A1 * | 3/2005 | Klotz et al. | ................... | 370/254 |

* cited by examiner

Primary Examiner — Yemane Mesfin
Assistant Examiner — Mon Cheri Davenport
(74) Attorney, Agent, or Firm — Hanley, Flight & Zimmerman, LLC

(57) ABSTRACT

Methods and apparatus to detect and restore flapping circuits in IP aggregation network environments are disclosed herein. An example method for use in maintaining a communication network includes retrieving information related to an operating state of a device associated with a network disturbance; determining whether the information related to the operating state of the device is indicative of a flapping condition; when the operating state information indicates that the flapping condition is present in the network, determining a cause of the flapping condition; when the cause of the flapping condition is a physical cause, selecting a first recovery procedure; and when the cause of the flapping condition is a logical cause, selecting a second recovery procedure different from the first recovery procedure.

14 Claims, 6 Drawing Sheets

METHODS AND APPARATUS TO DETECT AND RESTORE FLAPPING CIRCUITS IN IP AGGREGATION NETWORK ENVIRONMENTS

FIELD OF THE DISCLOSURE

The present disclosure relates generally to communication networks and, more particularly, to methods and apparatus to detect and restore flapping circuits in IP aggregation network environments.

BACKGROUND

To avoid and/or minimize prolonged service degradations, outages, and/or other types of network disturbances, communication service providers dedicate significant resources to maintaining communication networks and the services provided thereby. Typical maintenance procedures include generating trouble tickets in response to detecting or learning of one or more problems. A work center receives the trouble tickets and assigns and/or dispatches one or more technicians to the trouble ticket(s). The technician(s) are charged with resolving the problem(s) as quickly and as thoroughly as possible.

DETAILED DESCRIPTION

Figure 1:
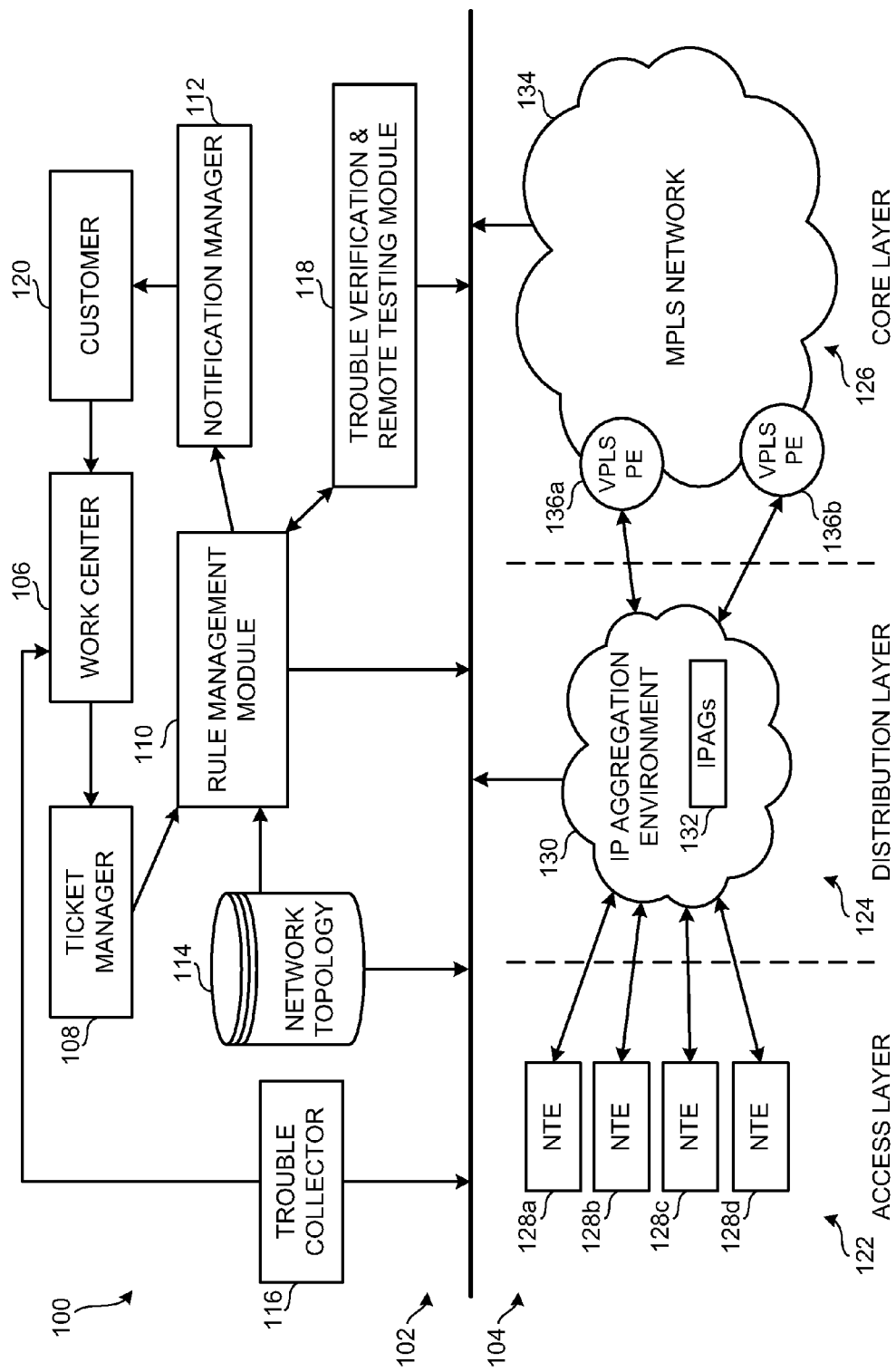
FIG. 1 is a schematic illustration of an example communication system.

Although the following discloses example methods, apparatus, systems, and/or articles of manufacture including, among other components, firmware and/or software executed on hardware, it should be noted that such methods, apparatus, systems, and/or articles of manufacture are merely illustrative and should not be considered as limiting. For example, it is contemplated that any or all of the firmware, hardware, and/or software components could be embodied exclusively in hardware, exclusively in software, exclusively in firmware, or in any combination of hardware, software, and/or firmware. Accordingly, while the following describes example methods, apparatus, systems, and/or articles of manufacture, the examples provided are not the only way(s) to implement such methods, apparatus, systems, and/or articles of manufacture.

Improvements in communication technology have allowed service providers to offer customers an increasingly broad range of services. Different types of services are now provided over single mediums and/or network infrastructures. For example, voice services (e.g., plain old telephone service (POTS) or voice over Internet protocol (VoIP)), data services (e.g., access to electronic information sources such as, for example, web servers, file transfer protocol (ftp) servers, database servers, mail servers, file servers, etc. via a transmission medium such as, for example, the Internet), video services (e.g., Internet protocol television (IPTV)), etc. can be provided via the same network infrastructure. As advanced types of services (e.g., L2 and L3 services such as, for example, IPTV, VoIP, High-Speed Internet, etc.) are offered across such network infrastructures, service providers are presented with challenges in assuring reliable, consistent service to customers. To address some of these challenges, many service providers have implemented IP aggregation environments.

As described in greater detail below, an IP aggregation environment includes aggregation routers that interface with devices operating according to different protocols. For example, different types of services and the devices associated therewith (e.g., network termination equipment (NTE) such as, for example, customer premises equipment (CPE)) operate according to different protocols. To enable such devices to communicate over the same network infrastructure, an IP aggregation environment interfaces with the devices using the native protocol of the devices and communicates within itself and/or with a core network (e.g., a network backbone) via a shared protocol (e.g., a higher layer protocol than the respective native protocol of an edge device). That is, an example function of an IP aggregation environment is to delivery a plurality of services from a first end device (e.g., a first customer premises equipment (CPE) device) operating according to a first protocol to a second end device (e.g., a second CPE device) operating according to a second protocol, which may be similar or dissimilar to the protocol of the first CPE device.

IP aggregation environments include dynamic routers, which include internal routing tables that change or update based on continuously recalculated routes or circuits. A dynamic router's routing table reflects the topology of the network from that router's perspective. To update the routing tables, dynamic routers exchange information related to the internal routing tables, by, for example, advertising and receiving destination information (e.g., one or more addresses corresponding to a route or circuit calculated for one or more pieces of data) to and from other dynamic routers.

In dynamic routing systems such as IP aggregation environments, an example problem that arises is flapping circuits. Generally, flapping circuits prevent a set of routers from converging. Convergence refers to a state in which a set of routers agree on the topology of the network. That is, when the overlapping portions of routing tables of each router match, the network associated with the routers is in convergence. Ideally, a network has a short convergence time (i.e., a period of time a network takes to converge after the routing tables are updated to reflect any changes in routing information), because a non-converging network is likely to function improperly or not at all.

Flapping circuits are pathological conditions in which one or more routers repeatedly advertise and withdraw routing information at an irregularly high rate. A related condition, referred to as interface flapping, occurs when an interface of a router announces itself as 'up' and then 'down' at an irregularly high rate. The rapidly changing routing information being broadcast by one or more routers associated with the flapping circuit (or interface) prevents the routers receiving the rapidly changing information from agreeing on the topology of the network for a useful period of time (e.g., a period of time sufficient to transport all information of, for example, a communication session). Thus, the network is prevented from converging and/or experiences a high convergence time when a flapping circuit occurs.

The example methods, apparatus, systems, and/or articles of manufacture described herein reduce convergence time in communication networks. For example, using the example methods, apparatus, systems, and/or articles of manufacture described herein, a service provider implementing an IP aggregation environment can identify a condition as a flapping circuit, determine a probable cause of the flapping circuit, and select one or more restoration procedures based on the calculated probable cause. As described in greater detail below, the detection and/or restoration of such conditions by the example methods, apparatus, systems, and/or articles of manufacture described herein and the resulting reduction in convergence time reduces an impact of service degradations and/or outages (which are sometimes referred to herein generally as disturbances).

FIG. 1 is a schematic illustration of an example communication system 100 capable of implementing the example methods, apparatus, systems, and/or articles of manufacture described herein. The example methods, apparatus, systems, and/or articles of manufacture described herein are applicable to additional or alternative types of systems, aggregation environments, and/or networks constructed using other technologies, topologies, and/or protocols. FIG. 1 depicts an example service provider operational support system 102 and an example network infrastructure 104. The example support system 102 of FIG. 1 includes a work center 106, a ticket manager 108, a rule management module 110, a notification manager 112, a network topology database 114, a trouble collector 116, and a trouble verification and remote testing (TVRT) module 118.

The work center 106 receives reports of network disturbances (e.g., a network service interruption, an unwarranted denial of service, an outage, a degradation of service, and/or any other type a problem encountered over a network) associated with the services provided via the example network infrastructure 104. The reports may originate at one or more sources such as, for example, a customer 120, a customer support call center, the example trouble collector 116, and/or any other source capable of experiencing and/or detecting service problems. The example trouble collector 116 of FIG. 1 is an automated error detection system capable of identifying and/or measuring service problems in the network infrastructure 104 and/or devices and/or systems in communication therewith. The example trouble collector 116 communicates with a plurality of internal monitoring devices implemented in the network infrastructure 104 that generate one or more alarms in response to conditions (e.g., in a router, a connection, a circuit, a route, a device, etc.) identified as problematic and/or likely to cause a problem, such as a service outage or degradation. In response to receiving information from, for example, the internal monitoring equipment, the example trouble collector 116 is capable of identifying and/or characterizing one or more conditions. In the illustrated example, the trouble collector 116 can identify condition(s) as related to a potential flapping circuit. Additionally, the example trouble collector 116 of FIG. 1 is capable of characterizing such a condition as a predictive problem. A predictive problem is a problem that is indicative of future problems or outages that are likely to occur. When the characteristics of the information received from the internal monitoring equipment indicate that the problem is likely to spread to additional circuits and/or devices (e.g., the problem has the potential to affect otherwise healthy circuits and/or devices), the example trouble collector 116 of FIG. 1 identifies the problem as a predictive problem by, for example, associating a predictive alert identifier with the information associated with the problem.

Operators at the work center 106 and/or devices configured to interact with internal monitoring equipment of the trouble collector 116 gather information related to the service problems such as, for example, a geographic location of the customer 120, an identification of the customer 120 (from which other information may be garnered from an administrative database), types of services experiencing the problems, durations of the problems, automatically generated error messages, device identifications, and/or any other type of information that may be useful in diagnosing, repairing, and/or otherwise addressing a service problem.

The work center 106 generates one or more trouble tickets including the gathered information (and any associated data such as, for example, a predictive alert identifier) and conveys the trouble ticket(s) to the ticket manager 108. The ticket manager 108 analyzes the received information to determine whether one or more of the trouble tickets are related to the same incident, service outage, service degradation, etc. For example, the ticket manager 108 may identify a problem automatically detected by the trouble collector 116 and a problem reported by the customer 120 as the same problem or a related problem. When one or more trouble tickets are attributable to the same issue or problem, the ticket manager 108 automatically eliminates the possible redundancy in work by combining the related trouble tickets and the information thereof into a single trouble ticket.

The example ticket manager 108 of FIG. 1 also tracks the status of trouble tickets and the service case(s) associated therewith. For example, the ticket manager 108 tracks, whether and when a service case was closed, a lifetime of an open trouble ticket and/or the associated service case, an entity currently responsible for the trouble ticket as the corresponding service case progresses through a chain of service levels, an estimated date of completion for the service case, etc.

Generally, the example rule management module 110 detects and/or restores a problematic condition in the example communication system 100 of FIG. 1 and/or in a portion thereof. For example, the rule management module 110 can identify a service problem as a flapping circuit. Additionally, the example rule management module 110 can determine whether the flapping circuit is and/or was caused by a physical issue, a logical issue, and/or another type of condition. Depending on the results of its analysis, the example rule management module 110 of FIG. 1 instructs one or more components of the support system 102 and/or the network infrastructure 104 to perform one or more of a plurality of recovery procedures. That is, the example rule management module 110 selects a first recovery procedure when a physical issue is identified as the cause of the flapping circuit, and the example rule management module 110 selects a second recovery procedure (which may be different from the first recovery procedure) when a logical issue is identified as the cause of the flapping circuit. The example rule management module 110 is described in greater detail below in connection with FIGS. 2 and 3.

When the example rule management module 110 restores service, schedules a restoration of a service, determines a cause of a problem, and/or takes any other action, the rule management module 110 sends a message to the example notification manager 112 indicative of the activity. The example notification manager 112 communicates information related to the actions taken and/or determinations made by the rule management module 110 to, for example, the customer 120 and/or another entity interested in the corresponding problem or issue. In the illustrated example, the notification manager 112 implements an automated voice response system capable of automatically calling an interested entity (e.g., the customer 120) and playing an audio recording including information about the service problem and/or a restoration of service.

The example network topology database 114 includes information related to past and/or current configurations of the network infrastructure 104 and/or other networks, devices, systems, etc. associated therewith. The network topology database 114 provides information to the rule management module 110 regarding a plurality of routes, circuits, and devices of the network infrastructure 104. As described in greater detail below in connection with FIG. 2, the rule management module 110 uses such information in determining, for example, a type of condition causing a flapping circuit.

The example trouble verification and remote testing (TVRT) module 118 of FIG. 1 receives instructions from the rule management module 110 to determine whether a certain portion or device of the network infrastructure 104 has lost connectivity. As described in greater detail below in connection with FIGS. 2, 3, 4A and 4B, at an initial stage of detecting, diagnosing, and/or restoring a problematic condition (e.g., a flapping circuit), the rule management module 110 may determine whether a cause of a problematic condition is a loss of connectivity and/or another issue related to equipment failure. In such instances, the example TVRT module 118 tests the connectivity of one or more devices associated with the current problem by, for example, conducting a ping test (i.e. pinging) on the one or more devices. A ping test provides information (e.g., return ping data or a lack thereof) to the TVRT module 118 such that the TVRT module 118 can inform the rule management module 110 as to the connectivity status of the corresponding devices and/or portions of the network infrastructure 104.

Generally, the example network infrastructure 104 of FIG. 1 provides voice services (e.g., VoIP service), Internet data, and/or video services (e.g., via a single physical layer technology, although logically separated according to, for example, traffic type). In the illustrated example of FIG. 1, the network infrastructure 104 is an Ethernet optical network providing communication services to a certain region or location defined by a service provider. For example, a Metro-Ethernet area network (MAN) covers a metropolitan area and is based on the Ethernet standard. While the example of FIG. 1 includes an Ethernet network, additional or alternative networks and/or technologies may be used to implement the network infrastructure 104 and/or in connection with the example methods, apparatus, systems, and/or articles of manufacture described herein.

The example network infrastructure 104 of FIG. 1 includes an access layer 122, a distribution layer 124, and a core layer 126. Generally, the access layer 122 provides physical connectivity to communication devices of the network infrastructure 104. In the illustrated example, the access layer 122 of FIG. 1 includes a plurality of edge devices 128a-c. In FIG. 1, the example edge devices 128a-c of FIG. 1 are network termination equipment (NTE). The example NTEs 128a-c may include and/or may be communicatively coupled to, for example, CPE end devices and/or data sources (e.g., databases, servers, repositories, etc.) (not shown) via any suitable communication system (e.g., a fiber optic communication system implementing Fiber to the Home or Fiber to the Curb, such as AT&T's Project Lightspeed®, a digital subscriber line (DSL) communication system (e.g., such as a DSL system implemented using asymmetric DSL (ADSL), very high data rate DSL (VDSL), etc.), a cable television communication system, a satellite communication system, a mobile telephone communication system, a public switched telephone (PSTN) communication system, etc.) and/or network (e.g., an Ethernet local area network (LAN), a wide area network (WAN), 2G, 2.5G and/or 3G wireless networks, proprietary access networks, etc.).

Generally, the example distribution layer 124 provides scalability and enforces quality of service on the network infrastructure 104. In the illustrated example, the distribution layer 124 includes an example IP aggregation environment 130. The example IP aggregation environment 130 provides a plurality of services to the network infrastructure 104 such as, for example, load balancing, intrusion detection, firewall protection, dynamic routing, and/or aggregation of traffic.

To aggregate traffic, the example IP aggregation environment 130 of FIG. 1 includes a plurality of IP aggregators (IPAGs) 132 implemented at, for example, central offices of the network infrastructure 104. Example central offices and example implementations of the IPAGs 132 are described in greater detail below in connection with FIG. 2. An example IPAG 132 aggregates communications from a set of devices (e.g., one or more of the NTEs 128a-c) operating according to different or similar protocols.

To dynamically route data, the example IP aggregation environment 130 implements routers (which may be the IPAGs 132 and/or other routers) in the illustrated example), which include routing tables that are repeatedly updated to reflect a current state of the network infrastructure 104. As described above, the dynamic routers sometimes experience flapping, leaving the network unable to converge and/or with an undesirably high convergence time.

The example core layer 126 provides a packet switching backplane for the network infrastructure 104. The core layer 134 communicates data between different nodes of the distribution layer 124 (e.g., among the IPAGs 132 and/or nodes including one or more of the IPAGs). In the illustrated example, the core layer 126 is facilitated using Multiprotocol Label Switching (MPLS) techniques. In particular, an MPLS-based network 134 includes a plurality of edge devices 136a-b in communication with the example IP aggregation environment 130. In the illustrated example, the edge devices 136a-b are implemented by Virtual private LAN service (VPLS) based devices 136a-b, which enable geographically separate sites or devices to share an Ethernet broadcast domain. However, the example methods, apparatus, systems, and/or articles of manufacture described herein can be implemented in association with one or more additional or alternative types of networks, edge devices, technologies, protocols, media, etc.

Figure 2:
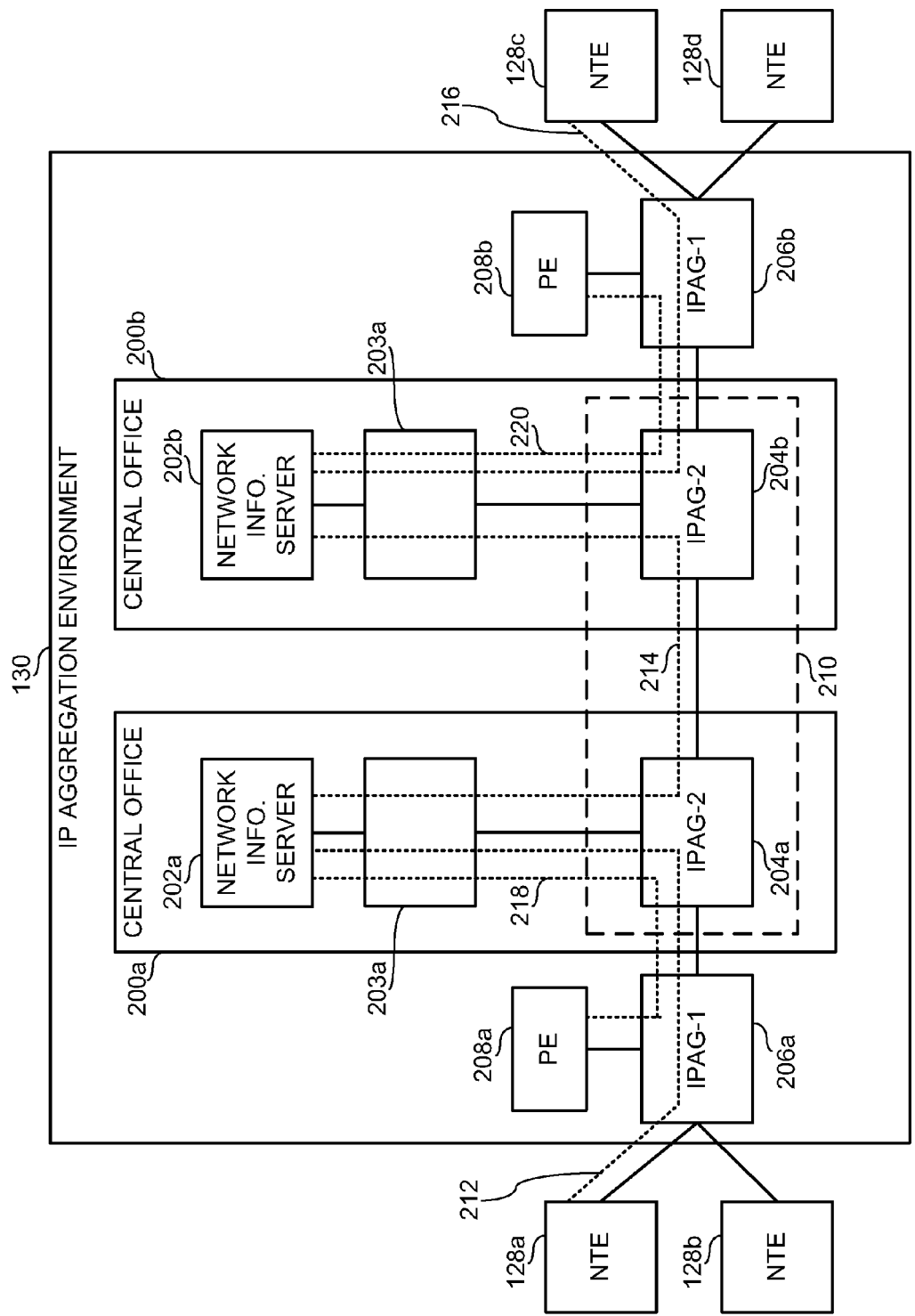
FIG. 2 is a schematic diagram illustrating an example implementation of the Internet protocol (IP) aggregation environment of FIG. 1.

FIG. 2 is a schematic diagram illustrating an example implementation of the IP aggregation environment 130 of FIG. 1. In the illustrated example of FIG. 2, the IP aggregation environment 130 includes a first central office (CO) 200a and a second CO 200b. The first CO 200a includes a first network information server 202a, a first router manager 203a, and a first level-two IPAG (IPAG-2) 204a. A first level-one IPAG (IPAG-1) 206a is in communication with the first level-two IPAG-2 204a. The IPAG-2 240a supplements the aggregation capabilities of the first IPAG-1 206a. For example, the first IPAG-2 204a may provide access and/or connectivity to layer 3 (e.g., in the standard OSI model) platforms (e.g., network management information systems (NMIS), an ATM virtual private network (AVPN), private network transport (PNT), etc.). The first IPAG-1 206a is coupled to a first provider edge (PE) device 208a. Additionally, the first IPAG-1 206a is in communication with a first plurality of NTE devices 128a-b (FIG. 1).

The first CO 200a is in communication with the second CO 200b, which includes similar components as the first CO 200a and is configured similarly as the first CO 200a. The first and second COs 200a and 200b are coupled (e.g., via a 10 Gigabit Ethernet connection) to form an IPAG cluster 210. The IPAGs 204a-b and 206a-b interact with the respective PE devices 208a-b to define one or more circuits by which the NTE devices 128a-d communicate. The NTE devices 128a-d may include and/or be implemented by CPE devices. That is, the IPAGs 204a-b and 206a-b include dynamic routing tables that define a circuit or route (e.g., for a communication session between two devices and/or data sources) for each interface or port of the IPAGs 204a-b and 206a-b corresponding to the NTE device (e.g., the first NTE device 128a) coupled to that interface or port.

The first and second network information servers 202a and 202b may include and/or are in communication with one or more components of the example service provider operational support system 102 of FIG. 1. In the illustrated example, the network information servers 202a and 202b are in communication with the example rule management module 110 (FIG. 1). As described in greater detail below in connection with FIGS. 3, 4A, and 4B, the example rule management module 110 accesses the network information server(s) 202a and/or 202b and/or conveys a request thereto for information regarding, for example, one or more of the IPAGs 204a-b and/or 206a-b and/or one or more of the PE devices 208a-b. To provide requested information related to, for example, the first IPAG-1 206a and/or the first IPAG-2 204a, the example first network information server 202a accesses and exchanges information with the first router manager 203a.

The first router manager 203a includes a management information base (MIB) having information related to and/or provided by one or more routers assigned to the first router manager 203a. In the illustrated example, the MIB of the router manager 203a includes a record of operating states for each router and, more specifically, for each interface or port of each router. For example, an interface of a router may be 'up' or 'down.' Also, for a dynamic router, an operating state may be reflected by current routing information. In the illustrated example, the operating state of a router repeatedly changes to reflect, for example, updated routing information and/or a current availability of one or more interfaces or ports. Additionally, the operating state information of the MIB is stored or tracked in association with times corresponding to changes in operating states. That is, the MIB of a router indicates what state an interface of a router operates in at certain times and for what duration the router operated in that operating state. Thus, the first network information server 202a can query the first router manager 203 and the MIB(s) thereof to determine how long a specific interface of a designated router operated in one state, when the operating state of the router changed, and/or other information related to an interface of a router or other component managed by the first router manager 203a (e.g., the first IPAG-1 206a, the first IPAG-2 204a, the first PE device 208a, etc.).

The MIBs associated with routers include additional information related to the operation and/or configuration of corresponding routers and such information is also available to, for example, the network information servers 202a-b. For example, the MIB associated with the first IPAG-2 204a includes traffic information corresponding to communications passing through the first IPAG-2. The MIB can include details associated with the traffic information such as, for example, how much traffic passed through the first IPAG-2 204a at what times, the type of traffic passing through the first IPAG-2 204a at different times, whether certain communications were rerouted from other routers and/or other devices, etc. Thus, congestion information directly and/or indirectly related to the corresponding router can be determined or calculated from the data of the MIB of the router managers 203a-b.

Figure 3:
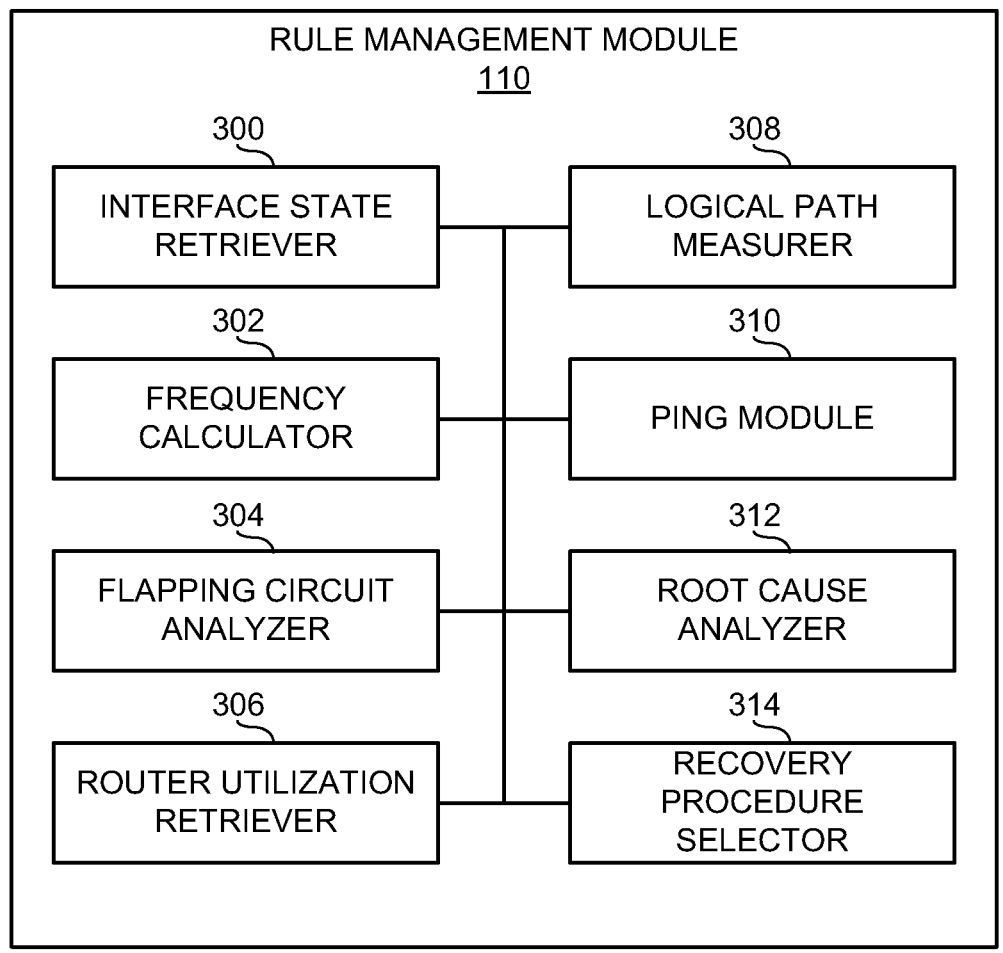
FIG. 3 is a block diagram illustrating an example implementation of the example rule management module of FIG. 1.

The example rule management module 110 and/or additional or alternative components of the operational support system 102 and/or the network infrastructure 104 may use information accessible by, for example, the network information servers 202a-b (e.g., operating state information and/or traffic information associated with the IPAGs 204a-b and/or 206a-b and/or the PE devices 208a-b) and/or additional or alternative information to detect, restore, and/or otherwise address flapping circuits of, for example, the network infrastructure 104. FIG. 3 is a block diagram illustrating an example implementation of the rule management module 110 of FIG. 1. The example rule management module 110 of FIG. 3 includes an interface state retriever 300, a frequency calculator 302, a flapping circuit analyzer 304, a router utilization retriever 306, a logical path measurer 308, a ping module 310, a root cause analyzer 312, and a recovery procedure selector 314. While an example manner of implementing the rule management module 110 of FIG. 1 has been illustrated in FIG. 3, one or more of the elements, processes and/or devices illustrated in FIG. 3 may be combined, divided, re-arranged, omitted, eliminated and/or implemented in any other way. Further, any or all of the example interface state retriever 300, the example frequency calculator 302, the example flapping circuit analyzer 304, the example router utilization retriever 306, the example logical path measurer 308, the example ping module 310, the example root cause analyzer 312, the example recovery procedure selector 314 and/or, more generally, the example rule management module 110 of FIG. 3 may be implemented by hardware, software, firmware and/or any combination of hardware, software and/or firmware. Thus, for example, any of the example interface state retriever 300, the example frequency calculator 302, the example flapping circuit analyzer 304, the example router utilization retriever 306, the example logical path measurer 308, the example ping module 310, the example root cause analyzer 312, the example recovery procedure selector 314 and/or, more generally, the example rule management module 110 of FIG. 3 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example interface state retriever 300, the example frequency calculator 302, the example flapping circuit analyzer 304, the example router utilization retriever 306, the example logical path measurer 308, the example ping module 310, the example root cause analyzer 312, the example recovery procedure selector 314 and/or, more generally, the example rule management module 110 of FIG. 3 are hereby expressly defined to include a tangible machine readable medium such as a memory, DVD, CD, etc. storing the software and/or firmware. Further still, the example rule management module 110 of FIG. 3 may include one or more elements, processes and/or devices in addition to, or instead of, those illustrated in FIG. 3, and/or may include more than one of any or all of the illustrated elements, processes and devices.

The example interface state retriever 300 of FIG. 3 conveys a request to one or more of the network information servers 202*a-b* for operating state information related to one or more routers (e.g., the IPAGS 204*a-b* and/or 206*a-b* and/or the PE devices 208*a-b*) and/or one or more interfaces thereof. In some examples, the example interface state retriever 300 requests operating state information related to an interface assigned and/or associated with the first NTE device 128*a*. Such a request is issued by the example interface state retriever 300 in response to, for example, the rule management module 110 receiving a trouble ticket related to a circuit associated with the first NTE device 128*a*, the first IPAG-1 206*a*, and/or the first IPAG-2 204*a*.

The requested operating state information can include any of a plurality of types of information. In the illustrated example, the interface state retriever 300 requests indications of a particular interface's current operating state and the operating state of that interface over a previous period of time (e.g., a selectable and/or predetermined period of time immediately preceding a switching of the interface to its current operating state). Additionally, the interface state retriever 300 requests timing information associated with the current operating state of the particular interface (e.g., how long the interface has been in the current operating state) and the operating state(s) of the previous period of time.

The example frequency calculator 302 of FIG. 3 receives information from the example interface state retriever 300 and determines a frequency at which the particular interface is changing operating states (e.g., over the period of time for which the interface state retriever 300 collected MIB information). In the illustrated example, the frequency calculator 302 determines a frequency at which a particular interface is changing its broadcasted state between 'up' and 'down.' This information can indicate a severity of a flapping circuit (e.g., a high frequency of state changes indicating a more severe flapping circuit than a low frequency of state changes).

The example flapping circuit analyzer 304 of FIG. 3 receives information from, for example, the interface state retriever 300 and the frequency calculator 302. The example flapping circuit analyzer 304 includes a set of rules (e.g., customizable rules to be set by a network technician, programmer, designer, etc.) configured to determine, for example, whether a flapping circuit exists, a severity of the problem(s) associated with the flapping circuit, and/or any other useful information regarding the potential flapping circuit.

For example, the flapping circuit analyzer 304 receives a first amount of time during which the polled interface (e.g., the interface from which the interface state retriever 300 collected MIB information) was in its last operating state. The example flapping circuit analyzer 304 also receives a second amount of time during which the polled interface was in its previous operating state (i.e., the operating state immediately prior to the last operating state). In the illustrated example, when the first amount of time is different from the second amount of time (e.g., when the interface was in a one operating state longer or shorter than another operating state) by a certain amount of time (e.g., within a threshold), the flapping circuit analyzer 304 determines that a flapping circuit exists in association with the polled interface.

The example flapping circuit analyzer 304 may factor in additional or alternative periods of time, operating states, and/or amounts of time when determining whether a flapping circuit exists, a severity of the problem(s) associated with a flapping circuit, etc. For example, the flapping circuit analyzer 304 may average a plurality of time amounts corresponding to a plurality of previous operating states and use the average amount of time in an operating state to compare to a current operating state. The example flapping circuit analyzer 304 may utilize other comparisons and/or techniques.

The example router utilization retriever 306 of FIG. 3 conveys a request to one or more of the network information servers 202*a-b* for utilization information related to one or more routers (e.g., the IPAGS 204*a-b* and/or 206*a-b* and/or the PE devices 208*a-b*) and/or one or more interfaces thereof. In an example instance, the example router utilization retriever 306 requests utilization information related to a plurality of interfaces assigned and/or associated with (or in communication with) the NTE devices 128*a-b* on the first IPAG-1 206*a*. Such a request is issued by the example router utilization retriever 306 in response to, for example, the rule management module 110 receiving a trouble ticket related to a circuit associated with any of the NTE devices 128*a-b*, the first IPAG-1 206*a*, and/or the first IPAG-2 204*a*.

The requested utilization information can include any of a plurality of types of information. In the illustrated example, the router utilization retriever 306 requests amounts of traffic currently passing through and/or assigned to a particular set of interfaces on the IPAG-1 206*a*. That is, the utilization information indicates a number of routes or circuits that are currently assigned to one or more of the set of interfaces. Additionally or alternatively, the utilization information may include an amount of data passing through the set of interfaces over a particular period of time (e.g., a period of time immediately preceding a current time). As described below, the utilization information can be used to determine a root cause of a flapping circuit identified by, for example, the flapping circuit analyzer 304. For example, a large amount of congestion on one or more routers may indicate that a root cause of a flapping circuit is a logical error in, for example, the routing tables of the routers and/or a method or technique being used to configure the routing tables.

The example logical path measurer 308 of FIG. 3 determines a logical distance between, for example, two network devices. In some examples, the logical path measurer 308 accesses the example network topology database 114 of FIG. 1 to obtain information on current and/or past configurations of the network infrastructure 104. In the illustrated example, the logical path measurer 308 measures a logical distance between the first NTE device 128*a* and the third NTE device 128*c*. Referring back to FIG. 2, the logical distance between the first NTE device 128*a* and the third NTE device 128*c* is represented by three paths: a first path 212 between the first NTE device 128*a* and the first network information server 202*a*, which passes through the first IPAG-1 206*a*, the first IPAG-2 204*a*, and the first router manager 203*a*; a second path 214 between the first network information server 202*a* and the second network information server 202*b*, which passes through the first router manager 203*a*, the first IPAG-2 204*a*, the second IPAG-2 204*b*, and the second router manager 203*a*; and a third path 216 between the second network information server 202*b*, which passes through the second router manager 203*b*, the second IPAG-2 204*b*, and the second IPAG-1 206*b*.

In the illustrated example, the logical path measurer 308 measures a logical distance between the first PE device 208*a* and the second PE device 208*b*. Referring back to FIG. 2, the logical distance between the first PE device 208*a* and the second PE device 208*b* is represented by three paths: a fourth path 218 between the first PE device 208*a* and the first network information server 202*a*, which passes through the first IPAG-1 206*a*, the first IPAG-2 204*a*, and the first router manager 203*a*; the second path 214 between the first network information server 202*a* and the second network information server 202*b*, which passes through the first router manager 203*a*, the first IPAG-2 204*a*, the second IPAG-2 204*b*, and the second router manager 203*a*; and a fifth path 220 between the second network information server 202*b*, which passes through the second router manager 203*b*, the second IPAG-2 204*b*, and the second IPAG-1 206*b*.

The example logical path measurer 308 determines the total logical distance of the paths between two designated devices. For example, when the logical path measurer 308 determines the example logical distance illustrated in FIG. 2 between the first NTE device 128*a* and the third NTE device 128*c*, the logical path measurer 308 determines (e.g., using information from the example network topology database 114 of FIG. 1) that the first logical path 212 has a magnitude of three (3) (using any suitable unit of measurement), the second logical path 214 has a magnitude of one (1), and the third logical path 216 has a magnitude of five (5). Thus, in the illustrated example, the logical path measurer 308 determines that the logical distance between the first NTE device 128*a* and the third NTE device 128*c* is nine (9).

Further, in the illustrated example, the logical path measurer 308 determines that the fourth logical path 218 has a magnitude of two (2), the second logical path 214 has a magnitude of one (1), and the fifth logical path 220 has a magnitude of four (4). Thus, in the illustrated example, the logical path measurer 308 determines that the logical distance between the first PE device 208*a* and the second PE device 208*b* is seven (7).

The example logical path measurer 308 conveys the calculated logical distance information to the example ping module 310. The example ping module 310 of FIG. 3 uses the logical distance information received from the logical path measurer 308 to detect and/or measure any condition(s) indicative of a physical condition that may cause a flapping circuit. For example, using logical distance information and one or more queries down the corresponding logical path(s), the ping module 310 can measure packet jitter, packet loss, packet delay, etc. of one or more interfaces of the corresponding circuit(s).

The example root cause analyzer 312 of FIG. 3 receives information from, for example, the flapping circuit analyzer 304, the router utilization retriever 306, the ping module 310, and/or any other component of the example rule management module 110 of FIG. 3. In the illustrated example, the example root cause analyzer 312 includes a set of rules designed to determine a root cause of, for example, a flapping circuit. For example, a flapping circuit may be caused by a physical problem with one or more devices and/or one or more interfaces thereof. Additionally or alternatively, a flapping circuit may be caused by a logical problem with one or more devices and/or one or more interfaces thereof.

The rules of the root cause analyzer 312 are applied to the example information described above as collected and/or developed by, for example, the flapping circuit analyzer 304, the router utilization retriever 306, and/or the ping module 310. An output of the root cause analyzer 312 indicates whether, for example, a flapping circuit is caused by a physical and/or logical problem and/or a likelihood that the flapping circuit is caused by a physical and/or logical problem.

In the illustrated example, the set of rules implemented by the root cause analyzer 312 determine that a flapping circuit is being caused or was caused by a logical problem when, for example, the router utilization information received from the example router utilization retriever 306 indicates that the corresponding router and/or interface(s) thereof is experiencing heavy congestion. That is, the root cause analyzer 312 compares the utilization of a router (e.g., one or more of the IPAGs 204*a-b* and/or 206*a-b* and/or the PE devices 208*a-b*) and/or an interface(s) thereof to a threshold and/or an expected value for a corresponding period of time, which may vary depending on, for example, a time of day. When the utilization of the router and/or the interface(s) exceeds the threshold and/or expected value, the example root cause analyzer 312 determines that the flapping circuit is due to a logical problem.

In the illustrated example, the set of rules implemented by the root cause analyzer 312 determine that a flapping circuit is being caused or was caused by a physical problem when, for example, the information received from the example ping module 310 indicates that the circuit(s) and/or route(s) corresponding to one or more routers and/or an interface(s) thereof is experiencing high packet jitter, high latency, high packet loss, and/or any other problematic characteristic. That is, the root cause analyzer 312 compares the information obtained and/or calculated by the ping module 310 related to one or more routers of a circuit(s) to a threshold and/or an expected value for a corresponding period of time. The expected value may be different at, for example, different times of day). When the measured packet jitter, latency, packet loss, and/or other characteristic exceeds (or does not meet, depending on the characteristic or measured value) the threshold and/or expected value, the example root cause analyzer 312 determines that the flapping circuit is due to a physical problem.

The example root cause analyzer 312 conveys a determination of the root cause of, for example, a flapping circuit to the example recovery procedure selector 314. In the illustrated example, the recovery procedure selector 314 includes a plurality of procedures configured to restore operation of a circuit(s), a route(s), a device(s), and/or an interface(s) associated with the information retrieved and/or analyzed by the example rule management module 110 of FIG. 3. For example, the recovery procedure selector 314 of FIG. 3 includes a first recovery procedure to be employed when a flapping circuit is detected and the cause of the flapping circuit is determined to be a logical problem (e.g., as indicated by high congestion on a router and/or an interface(s) thereof). In the illustrated example, the first recovery procedure includes an automatic rerouting of traffic from the problematic router(s) and/or interface(s) to another circuit (e.g., a circuit determined to be a replacement by the first recovery procedure).

Further, the example recovery procedure selector 314 of FIG. 3 includes a second recovery procedure to be employed when a flapping circuit is detected and the cause of the flapping circuit is determined to be a physical problem (e.g., as indicated by high packet jitter, high packet latency, high packet loss, etc.). In the illustrated example, the second recovery procedure includes an automated port or interface reconfiguration (e.g., a reset of an interface or port). Additionally, the example second recovery procedure of the recovery procedure selector 314 of FIG. 3 includes an automated rebooting of the corresponding router and/or other type of device associated with the detected physical problem causing the flapping circuit.

Figure 4A:
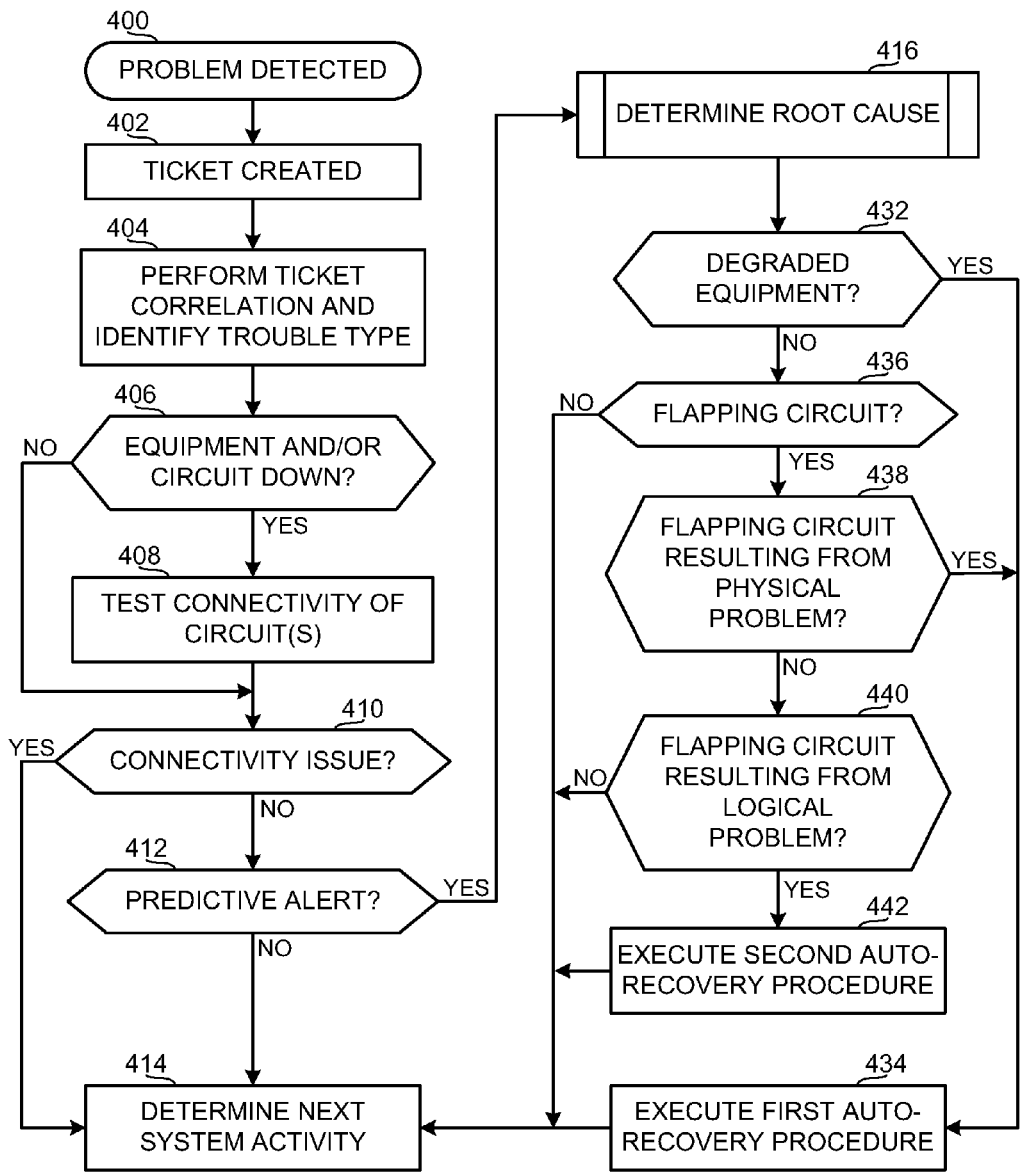
FIGS. 4A-4B are a flow diagram representative of example machine readable instructions that may be executed to implement the example components of the example communication system 110 of FIG. 1 to detect and/or restore flapping circuits.
Figure 4B:
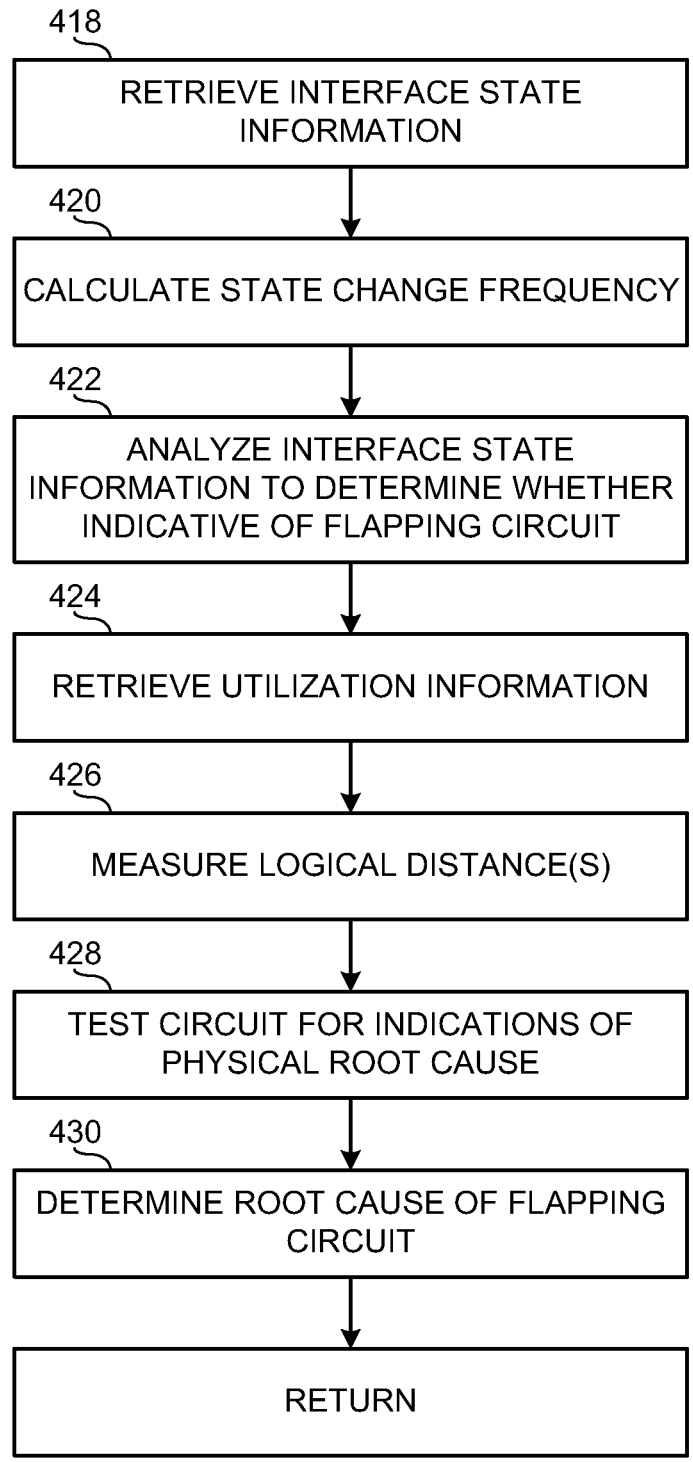

FIGS. 4A and 4B are a flow diagram representing machine readable instructions that may be executed to implement the example systems, methods, apparatus, and/or articles of manufacture described herein. In particular, FIGS. 4A and 4B depict a flow diagram representative of machine readable instructions that may be executed to implement the example rule management module 110 of FIGS. 1 and/or 3 and/or to detect, analyze, and/or restore flapping circuits in the example communication system 100 of FIG. 1. The example processes of FIGS. 4A and 4B may be performed using a processor, a controller and/or any other suitable processing device. For example, the example processes of FIGS. 4A and 4B may be implemented in coded instructions stored on a tangible medium such as a flash memory, a read-only memory (ROM) and/or random-access memory (RAM) associated with a processor (e.g., the example processor 510 discussed below in connection with FIG. 5). Alternatively, some or all of the example processes of FIGS. 4A and 4B may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIGS. 4A and 4B may be implemented manually or as any combination(s) of any of the foregoing techniques, for example, any combination of firmware, software, discrete logic and/or hardware. Further, although the example processes of FIGS. 4A and 4B are described with reference to the sequence diagram of FIGS. 4A and 4B, other methods of implementing the processes of FIGS. 4A and 4B may be employed. For example, the order of execution of the operations may be changed, and/or some of the operations described may be changed, eliminated, sub-divided, or combined. Additionally, any or all of the example processes of FIGS. 4A and 4B may be performed sequentially and/or in parallel by, for example, separate processing threads, processors, devices, discrete logic, circuits, etc.

In the illustrated example of FIG. 4A, a problem with the network infrastructure 104 (FIG. 1) is detected and/or identified (block 400). For example, the customer 120 (FIG. 1) may report a service degradation and/or service outage to the work center 106 (FIG. 1). Additionally or alternatively, the trouble collector 116 (FIG. 1) may automatically detect a service degradation and/or service outage (e.g., a service degradation and/or service outage related to a service degradation and/or service outage). In response to receiving information regarding the service degradation and/or outage, the work center 106 opens a service case and creates a trouble ticket including the information related to the reported and/or detected problem (block 402).

The trouble ticket is conveyed to the ticket manager 108 (FIG. 1), which performs a ticket correlation for recently received trouble tickets (e.g., tickets received during a certain period of time such as, for example, seven days) and identifies the type of problem associated with the trouble ticket (block 404). The ticket manager 108 performs the ticket correlation by analyzing a plurality of recently related tickets to identify one or more of the tickets as related to the same problem. For example, a customer-reported problem may be the same problem detected by the trouble collector 116. If so, the ticket manager 108 combines the two related tickets to avoid redundant work. Further, identifying the type of problem includes the ticket manger 108 determining what type of service (e.g., voice, data, video, and/or any combination thereof) is experiencing the degradation and/or outage, a severity level of the problem (e.g., how many customers are experiencing the degradation and/or outage), and/or any other information needed in diagnosing and/or restoring the problem.

In the illustrated example, the ticket manager 108 also determines (e.g., by analyzing the corresponding trouble ticket) whether the problem is an outage (which indicates that equipment and/or a circuit(s) is inoperable or down) or a degradation. When the ticket manager 108 determines that equipment and/or a circuit(s) is down (block 406), the TVRT module 118 tests the connectivity (e.g., physical connections) of one or more devices associated with the current problem (block 408). For example, a ping test may provide information to the TVRT module 118 regarding the connectivity status of the corresponding devices and/or portions of the network infrastructure 104. If the TVRT module 118 determines that a connectivity issue exists (block 410), the next system activity is determined based on the connectivity issue (block 414). In the illustrated example, block 414 includes a plurality of options to be taken by, for example, the operational support system 102 of FIG. 1, when the cause of the problem has been identified, resolved, and/or when the problem has otherwise been addressed. For example, in response to determining that connectivity issues led to the service outage described above, the rule management module 110 (FIG. 1) may determine that the next system activity is to notify (e.g., via the notification manager 112 (FIG. 1)) the customer 120 and to assign a technician (e.g., via the work center 106) to physically check on the connectivity of the problematic circuit. Other example activities that may be taken at block 414 include closing the trouble ticket, referring the problem to another level of operational support, notifying a financial department of the problem and the duration of the outage/degradation, generating a report of the case corresponding to the trouble ticket, etc.

Referring back to block 410, when the TVRT module 118 determines that connectivity is not the problem, the trouble collector 116 is then referenced to determine whether the problem was associated with a predictive alert (e.g., as detected by internal monitoring equipment associated with the trouble collector 116). As described above, the trouble collector 116 identifies a problem as associated with a predictive alert when the characteristics of the information received from the internal monitoring equipment indicate that the problem is likely to spread to additional circuits and/or devices (e.g., the problem has the potential to affect otherwise healthy circuits and/or devices). When the problem is not associated with a predictive alert 412, control proceeds to block 414 and the next system activity is determined. In the illustrated example, the rule management module 110 determines that the work center 106 is to assign a technician to run further tests on the problematic circuit.

When the problem is associated with a predictive alert (block 412), the rule management module 110 proceeds to determine a root cause(s) of the problem (block 416). An example manner of determining the root cause(s) at block 416 is depicted in FIG. 4B. To begin, the interface state retriever 300 (FIG. 3) of the example rule management module 110 described herein requests operating state information (e.g., from one or more MIBs of one or more routers and/or router managers) related to an interface or device associated with the problem (e.g., as indicated in the corresponding trouble ticket) (block 418). Referring to FIG. 2 for purposes of illustration, the interface state retriever 300 may request operating state information related to the IPAGS 204a-b and/or 206a-b and/or the PE devices 208a-b, depending on which of those devices are associated with the current problem.

The example frequency calculator 302 (FIG. 3) of the example rule management module 110 described herein uses the operating state information to determine a frequency at which the corresponding interface(s) is changing operating states (e.g., over a selectable period of time corresponding to the collected operating state information) (block 420). The example flapping circuit analyzer 304 (FIG. 3) of the example rule management module 110 uses the information from the interface state retriever 300 and the frequency calculator 302 to determine whether a flapping circuit exists (block 422). As described above, the example flapping circuit analyzer 304 includes a set of rules configured to interpret the information and to recognize a problem as caused by a flapping circuit.

Generally, when the operating state of the interface(s) is rapidly changing (e.g., too fast to allow the network routers converge), the cause of the problem is likely a flapping circuit. When the example flapping circuit analyzer 304 makes a determination, an indication of whether a flapping circuit is detected is stored (e.g., in associated with the trouble ticket in the rule management module 110).

The example router utilization retriever 306 (FIG. 3) of the rule management module 110 then retrieves utilization information related to one or more routers and/or other devices (block 424). Referring to FIG. 2 for purposes of illustration, the router utilization retriever 306 may request the utilization information related to the IPAGS 204a-b and/or 206a-b and/ or the PE devices 208a-b from one or more of the network information servers 202a-b. In the illustrated example, the router utilization retriever 306 requests amounts of traffic currently passing through and/or assigned to a particular set of interfaces on the IPAG-1 206a. Heavy congestion on the IPAG-1 206a (e.g., a large amount of communications passing through and/or assigned to a particular set of interfaces on the IPAG-1 206a) and/or any other router indicates that the flapping circuit associated therewith is likely caused by a logical problem with the dynamic routing of the network and/or the device.

The example logical path measurer 308 (FIG. 3) of the rule management module 110 measures a logical distance between, for example, two or more network devices (block 426). As described in detail above, the logical distance calculated by the logical path measurer 308 is used by the example ping module 310 (FIG. 3) of the rule management module 110 to detect and/or measure any conditions indicative of a physical condition that may cause a flapping circuit (block 428). For example, using logical distance information and one or more queries down the corresponding logical path(s), the ping module 310 can measure packet jitter, packet loss, packet delay, etc. of one or more interfaces of the corresponding circuit(s).

The example root cause analyzer 312 (FIG. 3) applies information received from, for example, the flapping circuit analyzer 304, the router utilization retriever 306, the ping module 310, and/or any other component of the example rule management module 110 of FIG. 3, to a set of rules designed to determine a root cause of, for example, a flapping circuit (block 430). For example, a flapping circuit may be caused by a physical problem with one or more devices and/or one or more interfaces thereof or a logical problem with, for example, a dynamic routing scheme and/or the routing tables used to implement the routing scheme. As described above, an output of, for example, an algorithm implementing the set of rules indicates whether, for example, a flapping circuit is caused by a physical and/or logical problem and/or a likelihood that the flapping circuit is caused by a physical and/or logical problem.

Returning to FIG. 4A, the output generated by the root cause analyzer 312 is conveyed to the example recovery procedure selector 314 (FIG. 3) of the rule management module 110. The recovery procedure selector 314 determines whether the problem is or was caused by degraded equipment (block 432). For example, when the flapping circuit analyzer 304 determines that a flapping circuit is not the likely cause of the problem and the ping module 310 detects a high rate(s) of packet loss, the recovery procedure selector 314 determines that degraded equipment is a likely cause of the problem. In such instances, the recovery procedure selector 314 selects a first one of a plurality of recovery procedures stored therein and/or in association therewith (block 434).

When the recovery procedure selector 314 determines that a flapping circuit is the likely cause of the problem (block 436), the recovery procedure selector 314 references the determination(s) made by the root cause analyzer 312 to determine whether the flapping circuit is or was caused by a physical or logical issue. In particular, the recovery procedure selector 314 determines whether the flapping circuit resulted from a physical problem (block 438). If so, the recovery procedure selector 314 selects the first recovery procedure (block 434). In the illustrated example, the first recovery procedure includes an automated port or interface reconfiguration (e.g., a reset of an interface or port). Additionally, the example first recovery procedure of the recovery procedure selector 314 of FIG. 3 includes an automated rebooting of the corresponding router and/or other type of device associated with the detected physical problem causing the flapping circuit. Additional or alternative recovery processes, actions, techniques, methods, and/or systems may be included in the first recovery procedure.

When the recovery procedure selector 314 determines that the flapping circuit resulted from a logical problem (block 440), the recovery procedure selector 314 selects a second recovery procedure (block 442). In the illustrated example, the second recovery procedure includes an automatic rerouting of traffic on the problematic router(s) and/or interface(s) to another circuit (e.g., a circuit determined to be an optimal replacement by the first recovery procedure). Additional or alternative recovery steps, techniques, methods, and/or systems may be included in the second recovery procedure.

When the recovery procedure(s) have been executed, the next system activity is determined (e.g., by the rule management module 110). For example, when the recovery procedure(s) execute and the network degradation and/or outage has been eliminated (e.g., high quality service has been restored), the trouble ticket associated with the addressed problem may be closed and the customer 120 may be notified of the action(s) taken and/or the restoration of service.

Figure 5:
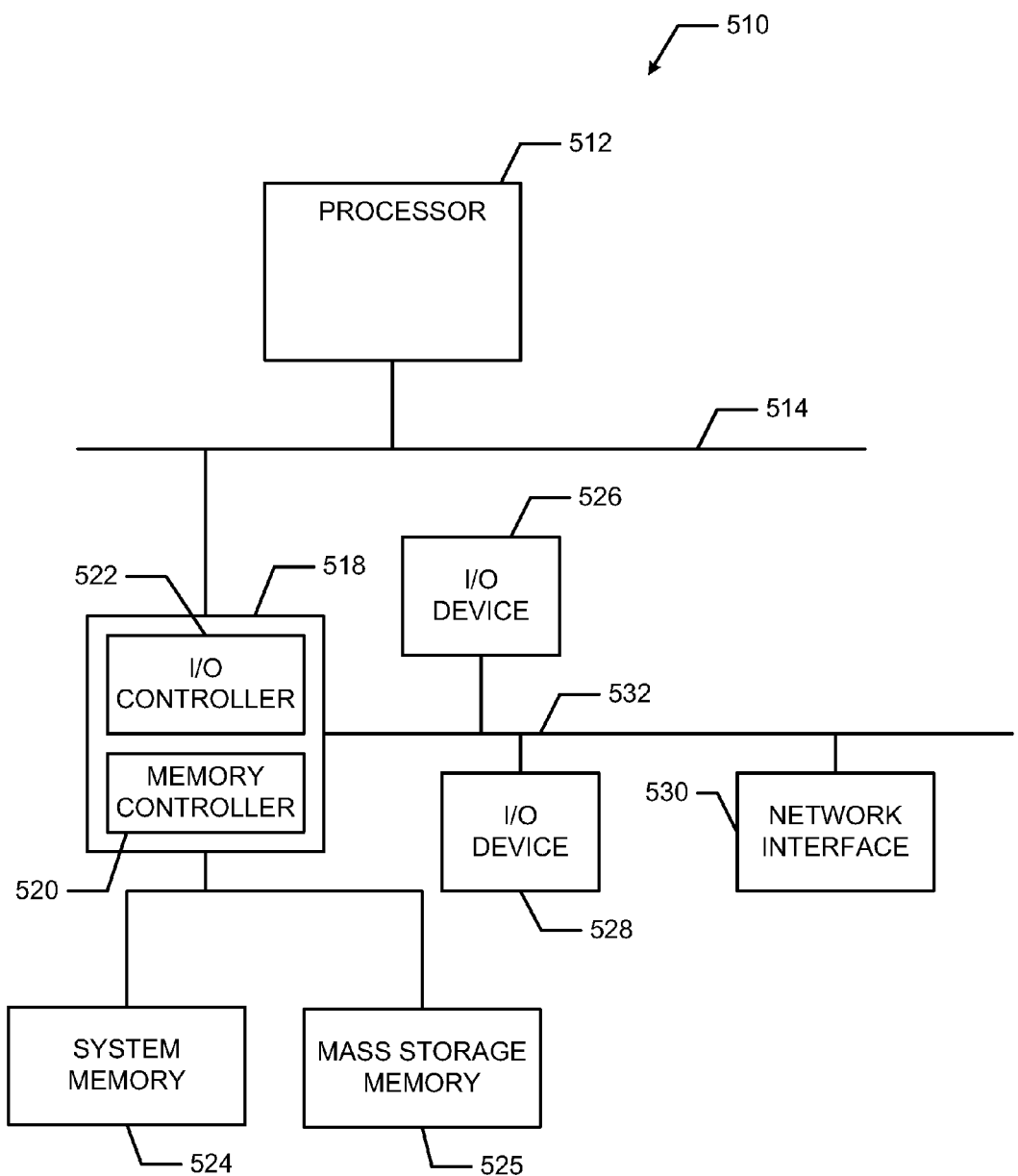
FIG. 5 is a block diagram of an example processor system that may be used to execute the machine readable instructions of FIGS. 4A-4B and/or to implement the example components of the example communication system 100 of FIG. 1.

FIG. 5 is a block diagram of an example processor system that may be used to execute the machine readable instructions of FIGS. 4A and 4B and/or to implement one or more of the example components of the example communication system 100 of FIG. 1. As shown in FIG. 5, the processor system 510 includes a processor 512 that is coupled to an interconnection bus 514. The processor 512 may be any suitable processor, processing unit or microprocessor. Although not shown in FIG. 5, the system 510 may be a multi-processor system and, thus, may include one or more additional processors that are different, identical or similar to the processor 512 and that are communicatively coupled to the interconnection bus 514.

The processor 512 of FIG. 5 is coupled to a chipset 518, which includes a memory controller 520 and an input/output (I/O) controller 522. The chipset 518 provides I/O and memory management functions as well as a plurality of general purpose and/or special purpose registers, timers, etc. that are accessible or used by one or more processors coupled to the chipset 518. The memory controller 520 performs functions that enable the processor 512 (or processors if there are multiple processors) to access a system memory 524 and a mass storage memory 525.

The system memory 524 may include any desired type of volatile and/or non-volatile memory such as, for example, static random access memory (SRAM), dynamic random access memory (DRAM), flash memory, read-only memory (ROM), etc. The mass storage memory 525 may include any desired type of mass storage device including hard disk drives, optical drives, tape storage devices, etc.

The I/O controller 522 performs functions that enable the processor 512 to communicate with peripheral input/output (I/O) devices 526 and 528 and a network interface 530 via an I/O bus 532. The I/O devices 526 and 528 may be any desired type of I/O device such as, for example, a keyboard, a video display or monitor, a mouse, etc. The network interface 530 may be, for example, an Ethernet device, an asynchronous transfer mode (ATM) device, an 802.11 device, a DSL modem, a cable modem, a cellular modem, etc. that enables the processor system 510 to communicate with another processor system.

While the memory controller 520 and the I/O controller 522 are depicted in FIG. 5 as separate blocks within the chipset 518, the functions performed by these blocks may be integrated within a single semiconductor circuit or may be implemented using two or more separate integrated circuits.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method for a communication network, comprising:
   measuring, via a processor, a logical distance of a logical network circuit including a device associated with a network disturbance;
   using the logical distance of the logical network circuit to measure a characteristic of the logical network circuit over a period of time;
   identifying, via the processor, a flapping condition based on information related to an operating state of the device;
   comparing the characteristic of the logical network circuit measured using the logical distance to a first threshold to calculate a first likelihood that the flapping condition is caused by a physical problem in the communication network;
   comparing an amount of congestion on the device to a second threshold to calculate a second likelihood that the flapping condition is caused by a logical problem in the communication network;
   when the first likelihood indicates that the flapping condition is caused by the physical problem, selecting a reset of an interface as a recovery procedure for the flapping condition; and
   when the second likelihood indicates that the flapping condition is caused by the logical problem, selecting a reroute as the recovery procedure for the flapping condition.

2. A method as defined in claim 1, wherein identifying the flapping condition based on the information related to the operating state of the device comprises calculating a rate at which the operating state of the device changed over a period of time including the network disturbance.

3. A method as defined in claim 2, wherein the operating state information is indicative of the flapping condition when the rate at which the operating state of the device changed over the period of time exceeds a third threshold.

4. A method as defined in claim 1, further comprising determining that the flapping condition is caused by the physical problem when the comparison of the characteristic of the logical network circuit and the first threshold indicates a presence of a physical error along the logical network circuit.

5. A method as defined in claim 1, wherein the characteristic comprises at least one of packet jitter, packet latency, or packet loss.

6. A method as defined in claim 1, wherein the recovery procedure further includes a reboot of the device when the first likelihood indicates that the flapping condition is caused by the physical problem, and the reroute as the recovery procedure includes a rerouting of a network communication from the device to another device.

7. A tangible machine accessible storage memory comprising instructions that, when executed, cause a machine to perform operations comprising:
   measuring a logical length of a logical network circuit including a device associated with a network disturbance;
   using the logical length of the logical network circuit to measure a characteristic of the logical network circuit over a period of time;
   identifying a flapping condition based on information related to an operating state of the device;
   comparing the characteristic of the logical network circuit measured using the logical length to a first threshold to calculate a first likelihood that the flapping condition is caused by a physical problem; and
   comparing an amount of congestion on the device to a second threshold to calculate a second likelihood that the flapping condition is caused by a logical problem;
   when the first likelihood indicates that the flapping condition is caused by the physical problem, selecting a reset of an interface as a recovery procedure for the flapping condition; and
   when the second likelihood indicates that the flapping condition is caused by a logical problem, selecting a reroute as the recovery procedure for the flapping condition.

8. A storage memory as defined in claim 7, wherein the operations further comprise determining that the flapping condition is caused by the physical problem when the comparison of the characteristic of the logical network circuit and the first threshold indicates a presence of a physical error along the logical network circuit.

9. A storage memory as defined in claim 7, wherein the recovery procedure further includes a reboot of the device when the first likelihood indicates that the flapping condition is caused by the physical problem, and the reroute as the recovery procedure includes a rerouting of network communications from the device to another device.

10. An apparatus, comprising:
    a memory comprising machine readable instructions; and
    a processor which, when executing the instructions performs operations comprising:
       determining whether information related to an operating state of a device is indicative of a flapping circuit, wherein the operating state information includes a rate at which the device is switching operating states;
       measuring a logical distance of a logical network circuit including the device associated with a network disturbance;
       determining a first likelihood that the flapping circuit is caused by a physical problem by comparing a characteristic associated with the device calculated using the logical distance and a first threshold;
       determining a second likelihood that the flapping circuit is caused by a logical problem by comparing congestion information associated with the device to a second threshold;

selecting a reset of an interface as a recovery procedure for the flapping circuit when the first likelihood indicates that the flapping circuit is likely caused by the physical problem; and selecting a reroute as the recovery procedure for the flapping circuit when the second likelihood indicates that the flapping circuit is likely caused by the logical problem.

11. An apparatus as defined in claim 10, wherein the recovery procedure further includes a reboot of the device when the first likelihood indicates that the flapping condition is caused by the physical problem, and the reroute as the recovery procedure includes a rerouting of network communications from the device to another device.

12. An apparatus as defined in claim 10, wherein a result of a ping test is used to determine the characteristic.

13. An apparatus as defined in claim 10, wherein the operations further comprise determining that the cause of the flapping circuit is likely the physical problem when the comparison of the characteristic of the logical network circuit and the first threshold indicates a presence of a physical error along the logical network circuit.

14. A storage memory as defined in claim 7, wherein identifying the flapping condition based on the information related to the operating state of the device comprises calculating a frequency at which the operating state of the device changed over a period of time including the network disturbance, wherein the operating state information is indicative of the flapping condition when the frequency at which the operating state of the device changed over the period of time exceeds a third threshold.

* * * * *